(12) United States Patent
Wodrich et al.

(10) Patent No.: US 11,597,378 B2
(45) Date of Patent: Mar. 7, 2023

(54) VEHICULAR SENSING SYSTEM FOR ANTICIPATING CUT-IN BY OTHER VEHICLE

(71) Applicant: MAGNA ELECTRONICS INC., Auburn Hills, MI (US)

(72) Inventors: Helmut A. Wodrich, Clarkston, MI (US); Walter G. Woodington, Lincoln, MA (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 339 days.

(21) Appl. No.: 16/949,813

(22) Filed: Nov. 16, 2020

(65) Prior Publication Data

US 2021/0061261 A1 Mar. 4, 2021

Related U.S. Application Data

(63) Continuation of application No. 15/695,378, filed on Sep. 5, 2017, now Pat. No. 10,836,376.

(Continued)

(51) Int. Cl.
*B60W 30/02* (2012.01)
*B60W 30/06* (2006.01)
(Continued)

(52) U.S. Cl.
CPC ............ *B60W 30/02* (2013.01); *B60W 30/06* (2013.01); *B60W 30/18163* (2013.01);
(Continued)

(58) Field of Classification Search
CPC ................. B60W 30/02; B60W 30/06; B60W 30/18163; B60W 40/114; B60W 2300/145; B60W 2420/52; B60W 2510/18; B60W 2520/14; B60W 2552/00; B60W 2554/00; B60W 2554/801; B60W 2556/50; B60W 2710/226
See application file for complete search history.

(56) References Cited

U.S. PATENT DOCUMENTS 5,949,331 A 9/1999 Schofield et al.
6,587,186 B2 7/2003 Bamji et al.
(Continued)

FOREIGN PATENT DOCUMENTS

WO 2018007995 A1 1/2018

*Primary Examiner* — Michael V Kerrigan
(74) *Attorney, Agent, or Firm* — Honigman LLP (57) ABSTRACT

A method for anticipating a lane change by another vehicle ahead of a vehicle equipped with a sensing system having a camera and a radar sensor includes processing captured image data to determine lane markers of a traffic lane along which the equipped vehicle is traveling, and to determine presence of another vehicle in an adjacent traffic lane. Responsive to processing of captured radar data, an oblique angle of a direction of travel of the other vehicle relative to the traffic lane is determined. Responsive to determination that the oblique angle of the direction of travel of the other vehicle is indicative of a cut-in intent of the other vehicle, and based on the determined range to the determined other vehicle, the system anticipates the cut-in of the other vehicle and applies a braking system of the equipped vehicle to mitigate collision with the determined other vehicle.

23 Claims, 7 Drawing Sheets

Related U.S. Application Data (60) Provisional application No. 62/383,790, filed on Sep. 6, 2016.

(51) Int. Cl.
  *B60W 30/18* (2012.01)
  *B60W 40/114* (2012.01)

(52) U.S. Cl.
  CPC ..... *B60W 40/114* (2013.01); *B60W 2300/145* (2013.01); *B60W 2420/52* (2013.01); *B60W 2510/18* (2013.01); *B60W 2520/14* (2013.01); *B60W 2552/00* (2020.02); *B60W 2554/00* (2020.02); *B60W 2554/801* (2020.02); *B60W 2556/50* (2020.02); *B60W 2710/226* (2013.01)

(56) References Cited

U.S. PATENT DOCUMENTS

| | | |
|---|---|---|
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 8,013,780 B2 | 9/2011 | Lynam |
| 8,027,029 B2 | 9/2011 | Lu et al. |
| 9,036,026 B2 | 5/2015 | Dellantoni et al. |
| 9,085,261 B2 | 7/2015 | Lu et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,739,881 B1 * | 8/2017 | Pavek .............. G01S 13/865 |
| 9,753,121 B1 | 9/2017 | Davis et al. |
| 10,836,376 B2 | 11/2020 | Wodrich et al. |
| 2010/0245066 A1 | 9/2010 | Sarioglu et al. |
| 2014/0085472 A1 | 3/2014 | Lu et al. |
| 2014/0160276 A1 | 6/2014 | Pliefke et al. |
| 2015/0002670 A1 | 1/2015 | Bajpai |
| 2015/0217693 A1 | 8/2015 | Pliefke et al. |
| 2017/0050672 A1 | 2/2017 | Gieseke et al. |
| 2017/0080940 A1 * | 3/2017 | Ito ..................... B60W 10/18 |
| 2017/0217372 A1 | 8/2017 | Lu et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0067194 A1 | 3/2018 | Wodrich et al. |
| 2018/0253608 A1 | 9/2018 | Diessner et al. |
| 2019/0225266 A1 | 7/2019 | Enomoto et al. |

\* cited by examiner

VEHICULAR SENSING SYSTEM FOR ANTICIPATING CUT-IN BY OTHER VEHICLE

CROSS REFERENCE TO RELATED APPLICATIONS

The present application is a continuation of U.S. patent application Ser. No. 15/695,378, filed Sep. 5, 2017, now U.S. Pat. No. 10,836,376, which claims the filing benefits of U.S. provisional application Ser. No. 62/383,790, filed Sep. 6, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle and comprising at least one radar sensor disposed at the vehicle and having a field of sensing exterior of the vehicle. The at least one radar sensor comprises multiple Tx (transmitters) and Rx (receivers) on an antenna array, so as to provide high definition, fine resolution in azimuth and/or elevation to determine high definition Radar Reflection Responses for objects detected by the system. The system includes a control, where outputs of the at least one radar sensor are communicated to the control, and where the control, responsive to the outputs of the at least one radar sensor, detects the presence of one or more objects exterior the vehicle and within the field of sensing of at least one of the at least one radar sensor.

The sensing system may determine object edges to determine that the detected object is another vehicle and to determine the oblique angle (or skewness) of the other vehicle present in the field of sensing relative to the motion of the source or equipped vehicle (equipped with the sensing system and sensor(s) of the present invention). Successive scanning cycles may be performed to establish vehicle level inputs, the location in range and relative lane position of the detected other vehicle. Comparison to the known lane locations determines the oblique angle (or skewness) of the detected vehicle relative to the lane traveled by the equipped vehicle, such that the system can preemptively anticipate lane change, cut-in or merge intent of the other vehicle.

The system may be operable (via a rearward sensing radar sensor of the vehicle) to attribute classified edges to a trailer being towed by the equipped vehicle. The edge position and trailer angle may be provided to vehicle systems supporting trailer angle detection. The motion of the trailer is analyzed using mathematical methods to determine the severity of trailer sway relative to the towing/equipped vehicle. Control methods may be used (responsive to the determined trailer sway frequency and/or amplitude) to provide active dampening of trailer sway.

These and other objects, advantages, purposes and features of the present invention will become apparent upon review of the following specification in conjunction with the drawings.

BRIEF DESCRIPTION OF THE DRAWINGS

FIG. 4 is a top plan view of a vehicle equipped with the sensing system of the present invention, showing oblique detection—merge and cut in;

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Figure 1:
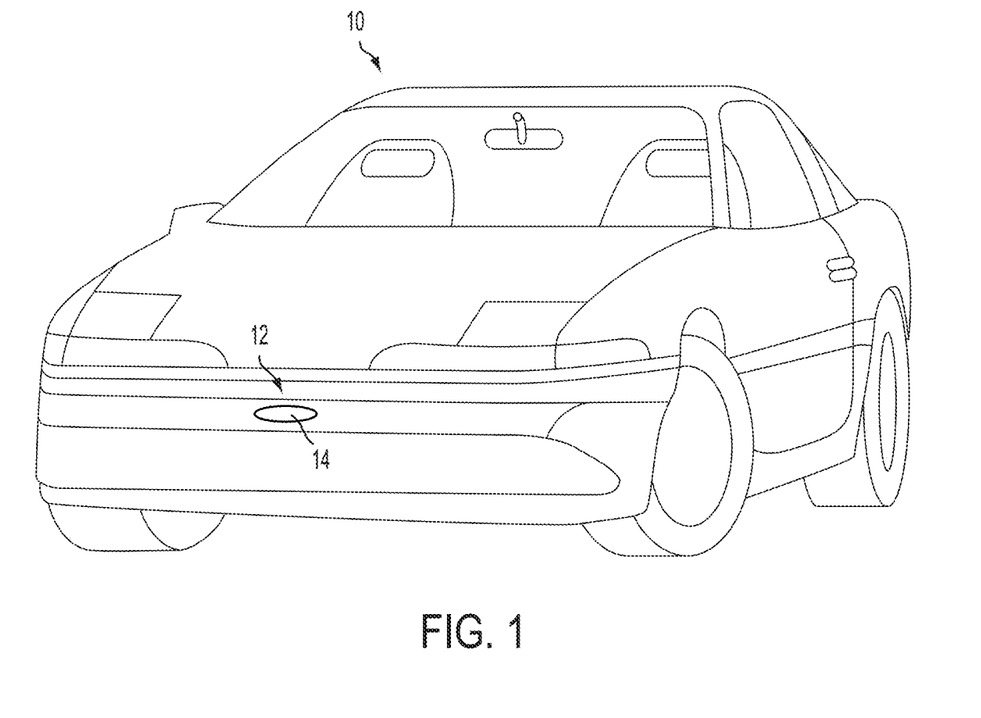
FIG. 1 is a perspective view of a vehicle with a sensing system that incorporates a radar sensor in accordance with the present invention.

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

In Advanced Driving Assistance Systems, the resolution of radar and machine vision systems have been limited. Typically, radar information has been limited to range, and velocity information with instability in the precise location of the edges of the vehicle, while vision systems have been able to assess width of objects and approximate range based on size of the object in the image. Anticipating rapid changes in intended path of travel for other vehicles, such as in situations such as cut in (of the other vehicle into the lane being traveled by the equipped vehicle and in front of the equipped vehicle), are difficult to recognize quickly. The radar sensors used typically have been limited to provide only track vector and velocity information, and have been unable to rapidly detect or confirm changes in the intended path of vehicles. Problems such as cut in, merging, lane drift, and avoidance maneuvers occur in the near field, where reaction timing is critical in maximizing the reduction of energy of impact, should an accident or near accident occur between the equipped vehicle and the cutting in or merging vehicle.

Figure 2:
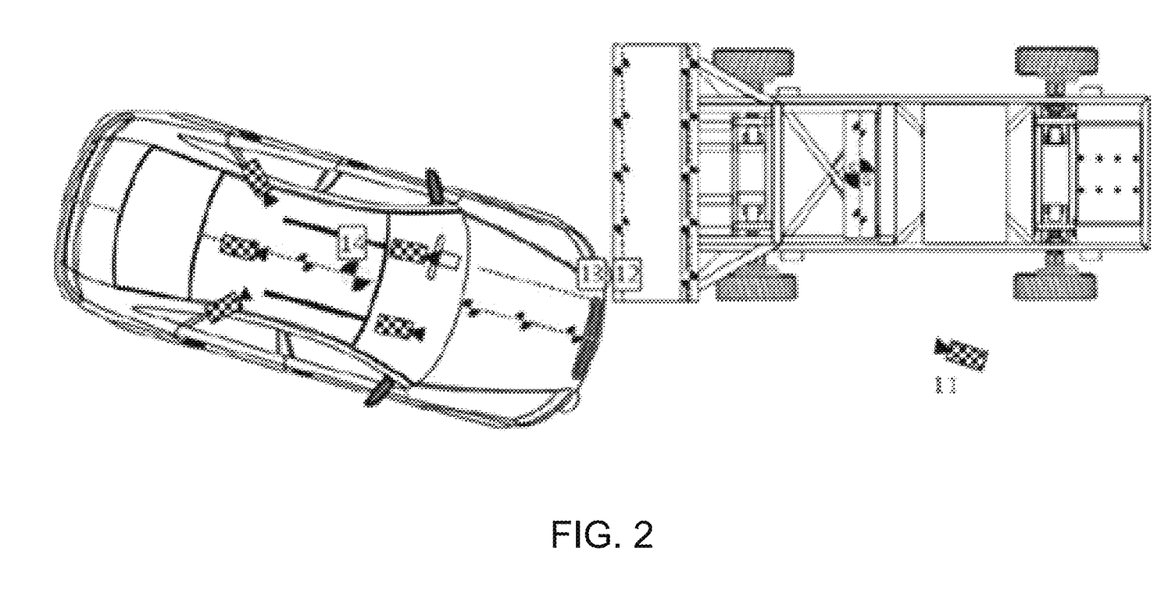
FIG. 2 is a schematic showing a small offset barrier collision scenario.

Similarly, problems such as offset collisions require precise means for location of the corners of vehicles or obstacles, so that systems can have sufficiently early detection to prevent or minimize the impact of collisions. Oblique angle collision avoidance (NCAP Oblique Angle Collision Avoidance) and small offset barrier tests (IIHS Small Offset Barrier), such as shown in FIG. 2, are expected to represent additional requirements placed on vehicle manufacturers to improve crash survivability.

The sensing system of the present invention comprises High Definition (HD) radar sensor(s) positioned at a vehicle to provide range, velocity, and angular information in horizontal and/or vertical fields of view (FOV). The radar sensor(s) include transmitters that transmit radio waves or signals and receivers that receive the transmitted signals as reflected off of objects in the field of sensing of the sensor(s). Use of sensors with high angular and range resolution distinguishes multiple radar reflection responses from the surfaces of the detected other vehicle. With high definition in azimuth and/or elevation, multiple reflections are received from each surface of the detected vehicle. Reflections are processed with data analysis software (SW) of the radar unit(s) or a central processing location to associate the multiple reflections to a single object. This set of reflections is analyzed using mathematical methods to determine the best fit determination of the vehicle edge. In combination with successive scanning cycles, vehicle level inputs, the location in range, and the relative lane position are established for the vehicle. Comparison to the known lane locations, available from a machine vision system, may be used as an input to determine the oblique angle (or skewness) of the detected vehicle relative to the lane being traveled by the equipped vehicle, preemptively anticipating the lane change intent of the detected vehicle. The sensing system is capable of providing at least one driving assist system function including, for example, (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and/or (xi) intersection collision mitigation.

Similarly, for oncoming or intersecting vehicle paths, the oblique angle determination is computed, permitting the determination probability for a potential of collision and a predicted point of contact. Responsive to such determinations, the system may activate collision avoidance measures, including braking of the equipped vehicle, steering of the equipped vehicle and/or acceleration of the equipped vehicle, to mitigate the effects of the potential or likely or imminent collision.

Figure 3:
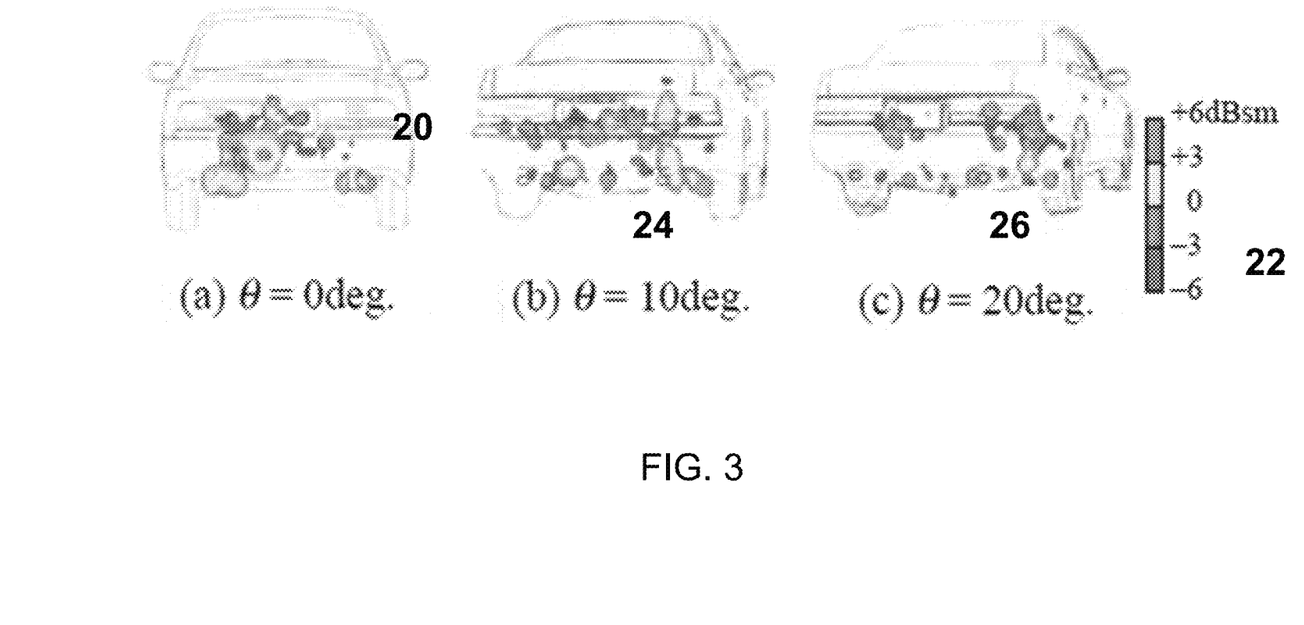
FIG. 3 are images showing the effect of aspect angle on the Radar Reflection Response (R3) of a vehicle.

In accordance with the present invention, and such as shown in FIG. 3, multiple reflections 20 are received from the rear and/or sides of the vehicle. The reflections are associated with a single vehicle based on motion attributes to determine the vehicle's surfaces. As shown in FIG. 3, responses are characterized by the response strength 22, and vary with the oblique angle of the detected vehicle relative to the equipped vehicle. As the other vehicle begins to turn or initiate a lane change, an oblique view of the other vehicle is presented to the radar sensor(s) in the equipped vehicle. An example of the change in response is shown in FIGS. 3 at 20, 24 and 26 as the oblique angle of the detected vehicle changes relative to the source vehicle or equipped vehicle (radar location).

Figure 4:
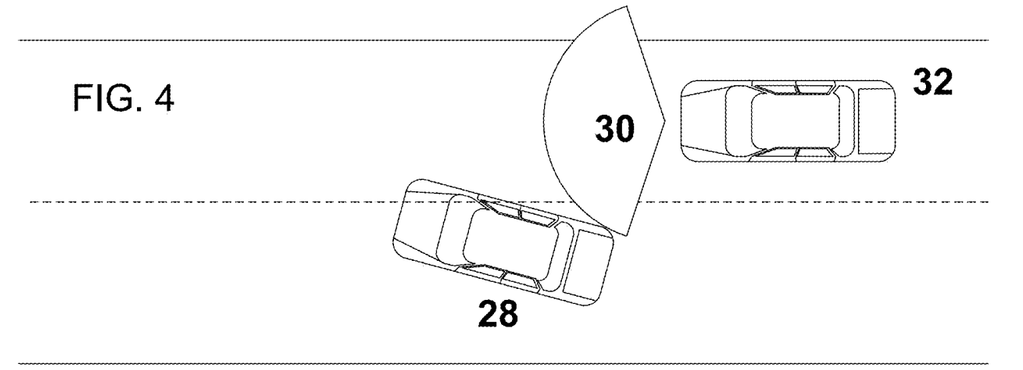
Figure 4A:
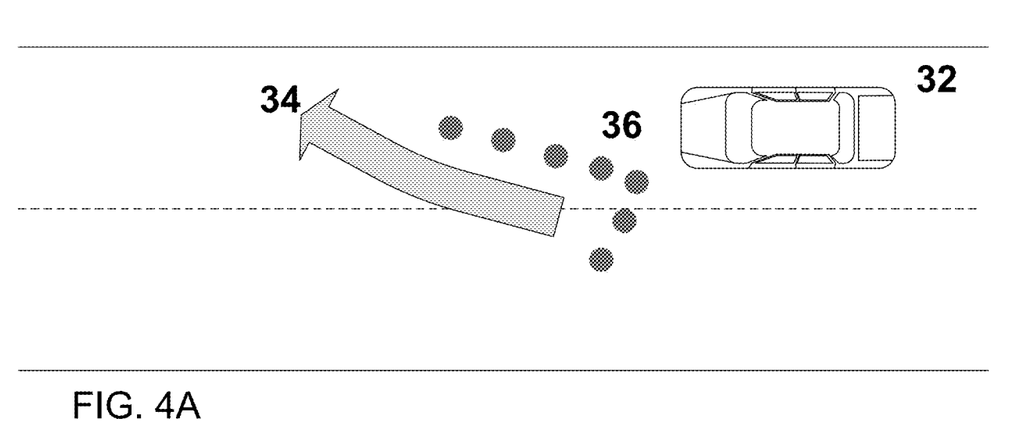
FIG. 4A is a representation of the HD Radar Response for the scenario shown in FIG. 4.

During vehicle overtaking (such as shown in FIG. 4), the radar system recognizes the overtaking vehicle 28 as it enters the field of sensing or view (FOV) 30 of the radar sensor of the equipped vehicle 32. If the vehicle is also equipped with side scanning radars, the overtaking other vehicle would be recognized prior to overtaking the equipped vehicle and while alongside the equipped vehicle. As shown in FIG. 4A, the overtaking vehicle 28 has been represented by the path of motion or tracked motion 34 of the overtaking vehicle that has been established by the radar system. Similarly, the radar response of the overtaking vehicle represents the series of responses 36, their strengths, ranges and azimuth angle relative to the source or equipped vehicle. By comparison of the response strength, range and azimuth angle, the edges of the overtaking vehicle are established and the path of travel 34 of the overtaking vehicle is determined.

Figure 5:
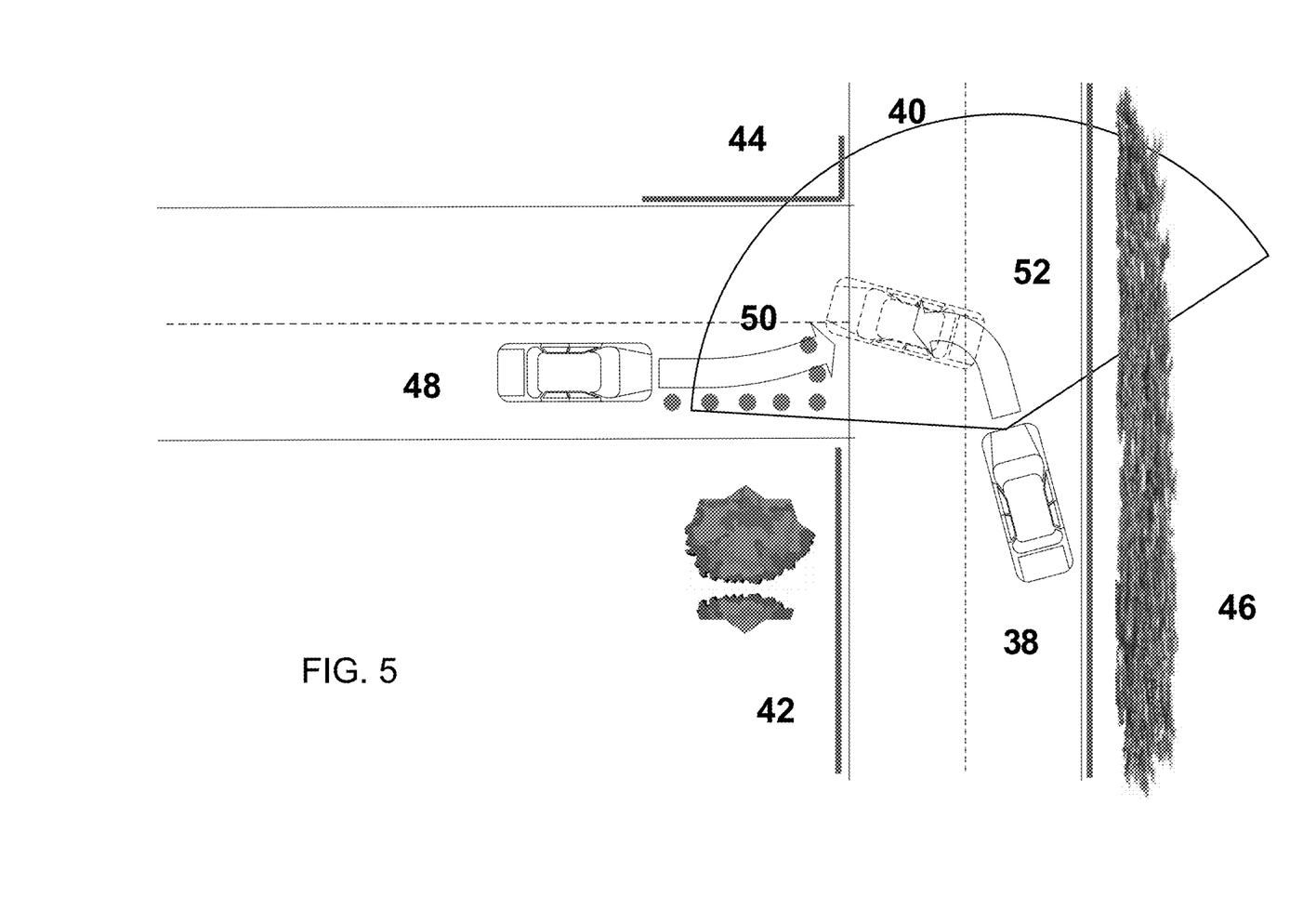
FIG. 5 is a top plan view of a vehicle equipped with the sensing system of the present invention, showing oblique detection—left turn: intersection collision mitigation.

As shown in FIG. 5, while the source or equipped vehicle 38 is traversing roadways, the high definition radar (having a forward field of sensing 40) establishes an environment of the roadway and adjacent areas, locating roadway edges 42, curbs 44, trees and hedges 46. As the equipped vehicle approaches an intersection, the environment map provides a reference for the geometry of the intersection. This information can be compared with additional sources of information, such as GPS inputs, camera based machine vision, cloud or on-board based high definition local maps and/or the like, to supplement the information gathered by the high definition radar. Potentially, another vehicle 48 could be approaching the intersection. The range, speed, acceleration/deceleration, heading, and response magnitude of the other detected vehicle are obtained for a plurality of reflections from the other vehicle to provide the instantaneous oblique angle measurement and the expected vehicle path and position 50 of the other vehicle.

Onboard the source vehicle or equipped vehicle 38, the driver intent path or semi-autonomous or fully autonomous expected vehicle path 52 can be determined and/or controlled. Provided the information gathered from environment mapping, an optimized path plan for the equipped vehicle can be established to avoid a potential collision anticipated based on the detected other vehicle's expected path and position. Using these inputs, a collision mitigation strategy involving driver warnings, steering, braking, and/or acceleration of the equipped vehicle may be implemented. Where a collision is imminent and unavoidable, the system may determine an optimized collision scenario to provide maximum protection to drivers and passengers of both of the vehicles.

Additionally, the ability to detect minimal changes in the oblique angle of adjacent vehicle or trailers, offers the potential for features designed to enhance the driving experience.

For scenarios where the equipped vehicle is towing a trailer, the determination of oblique angle and the measure of the periodic swaying motion of the trailer can be determined based on changes to the oblique angle (of the longitudinal axis of the trailer relative to the longitudinal axis of the vehicle). During towing by a source vehicle or equipped vehicle (equipped with a rearward sensing sensor and system of the present invention), swaying of the trailer is observable (via processing sensor data captured by one or more rearward sensing radar sensors) with SW designed to extract the maximum, minimum, frequency and variance of the periodic motion. Controls to manage trailer sway, including active sway management, are envisioned to suppress the negative NVH (Noise, Vibration, and Harshness) and improve vehicle handling and dynamics.

Figure 6:
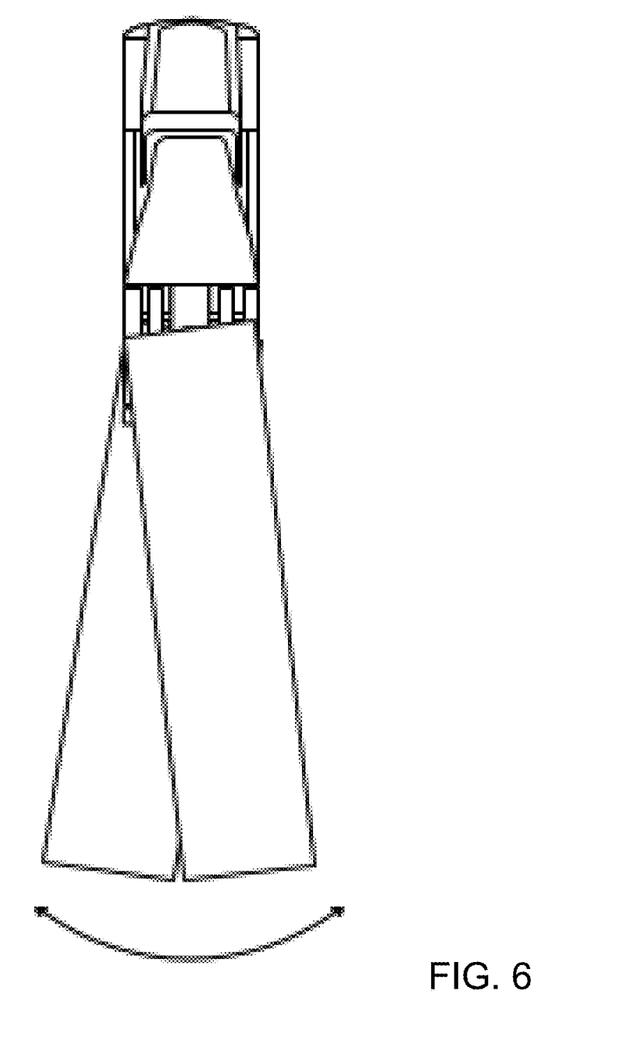
FIG. 6 is a top plan view of a vehicle equipped with the sensing system of the present invention, showing trailer sway detection.
Figure 7:
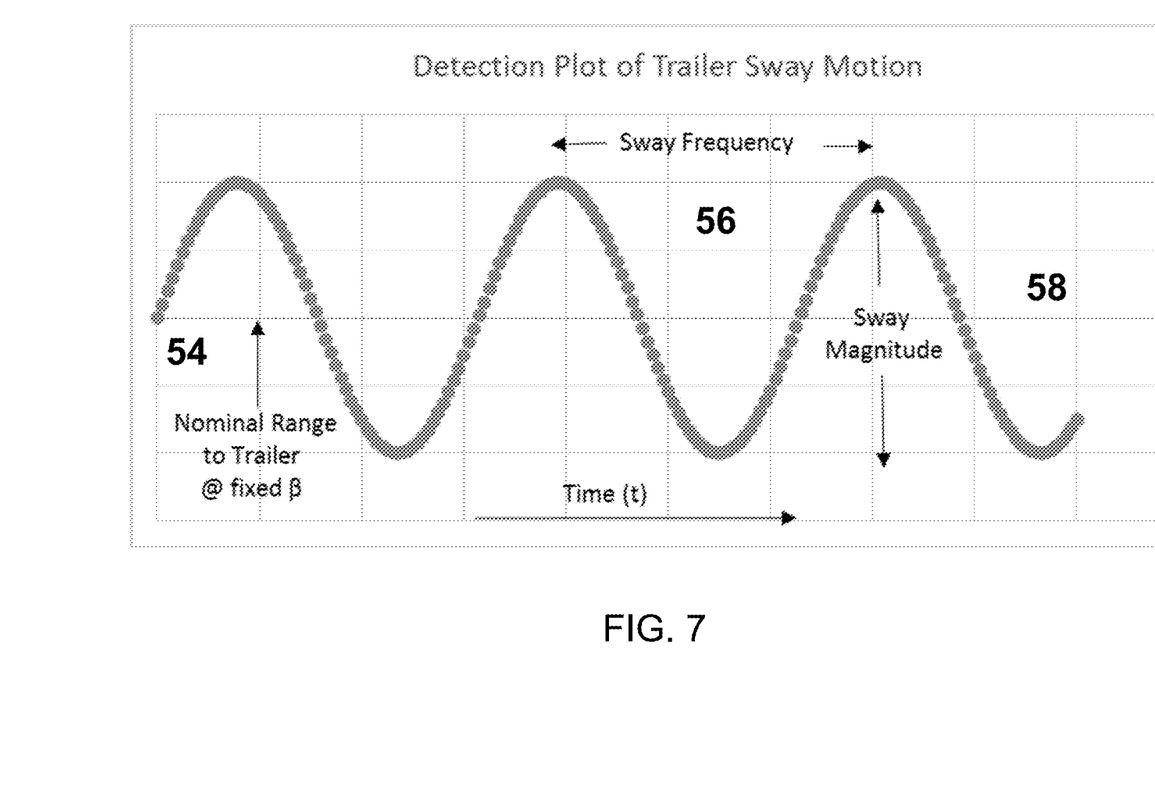
FIG. 7 is a detection plot showing detection of trailer sway motion.

In such trailering conditions, sensors oriented to the rear and sides of the vehicle would have visibility to the front and sides of a trailer, such as a tractor trailer combination, fifth wheel or traditional trailer being towed by the equipped vehicle (FIG. 6). Using high definition radar, a baseline for the edge locations and responses may be established. During trailering, the sway or motion of the trailer becomes periodic (FIG. 7). For each location within the azimuth coverage of the FOV of the radar system, a nominal range 54 exists, having been previously established in the baseline, around which any trailer sway would have a periodic motion. The combination of nominal ranges across the azimuth provides a real time, accurate measure of the trailer angle. The period of the detected range variance 56 corresponds with the frequency of the sway of the trailer relative to the towing vehicle, while the amplitude 58 corresponds to the magnitude of the sway of the trailer relative to the towing vehicle. Analysis of these motion plots for a plurality of azimuth positions provides the overall motion of the trailer, where the amplitude of motion-range-azimuth-response strength is correlated to increasing magnitudes of trailer sway. The magnitude of trailer sway translates to the harshness perceived by the driver of the vehicle trailering. Control methods are envisioned that, by utilizing the determined magnitude and frequency of the trailer sway, determine limits for active dampening of trailer sway.

Therefore, the present invention provides a vehicle sensing system having a radar sensor that comprises multiple Tx (transmitters) and Rx (receivers) on an antenna array, so as to provide high definition, fine resolution in azimuth and/or elevation, to determine high definition Radar Reflection Responses for objects detected by the system. The high definition Radar Reflections (range, azimuth, velocity, magnitude, and/or the like) are evaluated by data analysis SW methods to establish surface responses for objects in the device(s) field of view. The set of reflections is analyzed using mathematical methods, determining the best fit determination of the object edges, and classification of stationary, vehicular or pedestrian based on motion factors. The set of reflections that are analyzed and classified as stationary are aggregated into a high definition environmental map.

The object edges establish the oblique angle (or skewness) of another vehicle observed in the sensor's field of view relative to the motion of the source or equipped vehicle. Successive scanning cycles are performed to establish vehicle level inputs, the location in range and relative lane position. Comparison to the known lane locations, available from a machine vision system used as an input, determines the oblique angle (or skewness) of the detected vehicle relative to the lane traveled by the equipped vehicle, preemptively anticipating lane change, cut-in or merge intent.

The sensing system may include a machine vision system (comprising at least one exterior viewing camera disposed at the vehicle and an image processor for processing image data captured by the at least one camera), where information is shared between the stereo radar and the machine vision system.

The system may include two or more individual radars, having individual or multiple Tx (transmitters) and Rx (receivers) on an antenna array, spaced at a known separation (x, y, z) and aligned within a known attitude (pitch, roll, yaw), where information is shared between individual radars operating in stereo, to determine high definition Radar Reflection Responses for objects detected by the system. The high definition Radar Reflections (range, azimuth, velocity, magnitude, and/or the like.) are evaluated by data analysis SW methods to establish surface responses for objects in the device(s) field of view. The set of reflections is analyzed using mathematical methods determining the best fit determination of the object edges, and classification of stationary, vehicular or pedestrian based on motion factors. The set of reflections analyzed and classified as stationary are aggregated into a high definition environmental map. The object edges establish the oblique angle (or skewness) of the vehicle observed in the field of view relative to the motion of the equipped vehicle. Successive scanning cycles, vehicle level inputs, the location in range, relative lane position are established for the vehicle. Comparison to the known lane locations, such as may be available from a machine vision system of the vehicle used as an input, determines the oblique angle (or skewness) of the detected other vehicle relative to the lane, preemptively anticipating lane change, cut-in or merge intent of the other vehicle at or near or in front of the equipped vehicle.

The system may include a machine vision system, where information is shared between the stereo radar and the machine vision system. The system may utilize environment mapping and/or vehicle oblique angles and path information to implement closed loop motion control (steering, braking, etc.) to avoid collisions or mitigate their impact.

The system may be operable to attribute classified edges to a trailer being towed by the equipped vehicle. The edge position and trailer angle are provided to vehicle systems supporting trailer angle detection. The motion of the trailer is analyzed using mathematical methods, to determine the severity of trailer sway relative to the towing/equipped vehicle. Control methods may be used (responsive to the determined trailer sway frequency and/or amplitude) to provide active dampening of trailer sway.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454;

7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication No. WO 2011/090484 and/or U.S. Publication Nos. US-2017-0222311 and/or US-2010-0245066, and/or U.S. patent applications, Ser. No. 15/685,123, filed Aug. 24, 2017, and published on Mar. 1, 2018 as U.S. Publication No. US-2018-0059236, Ser. No. 15/675,919, filed Aug. 14, 2017, now U.S. Pat. No. 10,641,867, Ser. No. 15/647,339, filed Jul. 12, 2017, now U.S. Pat. No. 10,239,446, Ser. No. 15/619,627, filed Jun. 12, 2017, now U.S. Pat. No. 10,768,298, Ser. No. 15/584,265, filed May 2, 2017, now U.S. Pat. No. 10,534,081, Ser. No. 15/467,247, filed Mar. 23, 2017, now U.S. Pat. No. 10,571,562, Ser. No. 15/446,220, filed Mar. 1, 2017, and published on Sep. 7, 2017 as U.S. Publication No. US-2017-0254873, and/or Ser. No. 15/675,919, filed Aug. 14, 2017, now U.S. Pat. No. 10,641,867, and/or International PCT Application No. PCT/IB2017/054120, filed Jul. 7, 2017, and published on Jan. 11, 2018 as International Publication No. WO 2018007995, and/or U.S. provisional application Ser. No. 62/383,791, filed Sep. 6, 2016, which are hereby incorporated herein by reference in their entireties.

The system may utilize aspects of the trailering or trailer angle detection systems described in U.S. Pat. Nos. 9,085,261 and/or 6,690,268, and/or U.S. Publication Nos. US-2017-0217372; US-2017-0050672; US-2015-0217693; US-2014-0160276; US-2014-0085472 and/or US-2015-0002670, and/or U.S. patent application Ser. No. 15/446,220, filed Mar. 1, 2017, and published on Sep. 7, 2017 as U.S. Publication No. US-2017-0254873, and/or U.S. provisional application Ser. No. 62/466,449, filed Mar. 3, 2017, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for anticipating a lane change by another vehicle ahead of a vehicle equipped with a sensing system, the method comprising:
   disposing at least one forward-sensing radar sensor at a vehicle equipped with the sensing system, the at least one forward-sensing radar sensor having a field of sensing exterior and at least forward of the equipped vehicle, wherein the at least one forward-sensing radar sensor comprises an antenna array having multiple transmitting antennas and multiple receiving antennas;
   disposing a forward-viewing camera at the equipped vehicle and having a field of view exterior and at least forward of the equipped vehicle;
   providing a control at the equipped vehicle, the control comprising at least one processor;
   transmitting, via the transmitting antennas, radar signals and receiving, via the receiving antennas, the radar signals reflected off objects, and capturing, via the at least one forward-sensing radar sensor, radar data based on the received radar signals;
   providing the radar data captured by the at least one forward-sensing radar sensor to the control;
   capturing image data via the forward-viewing camera;
   providing the image data captured by the forward-viewing camera to the control;
   determining, via the control, and responsive to processing at the control of provided captured image data, lane markers of a traffic lane that the equipped vehicle is traveling in on a road being traveled along by the equipped vehicle;
   determining, via the control, and responsive to processing at the control of provided captured image data, presence of another vehicle in the field of view of the forward-viewing camera and in a traffic lane adjacent to the traffic lane that the equipped vehicle is traveling in;
   determining, via the control, and responsive to processing at the control of the provided captured radar data, (i) a direction of travel of the determined other vehicle and (ii) an oblique angle of the determined direction of travel of the other vehicle relative to the traffic lane that the equipped vehicle is traveling in;
   determining, via the control, whether the determined oblique angle is indicative of a cut-in intent of the determined other vehicle to move into the traffic lane that the equipped vehicle is traveling in;
   determining, via the control, and responsive to determination that the determined oblique angle of the determined direction of travel of the other vehicle is indicative of the cut-in intent of the determined other vehicle, range to the determined other vehicle and lane position of the determined other vehicle relative to the equipped vehicle and relative to the determined lane markers; and
   responsive to determination that the determined oblique angle of the determined direction of travel of the other vehicle is indicative of the cut-in intent of the determined other vehicle, and based on the determined range to the determined other vehicle and lane position of the determined other vehicle relative to the equipped vehicle and relative to the determined lane markers, (i) anticipating the cut-in of the determined other vehicle ahead of the equipped vehicle into the traffic lane that the equipped vehicle is traveling in and (ii) applying a braking system of the equipped vehicle to mitigate collision with the determined other vehicle.

2. The method of claim 1, comprising detecting, via the control, and responsive to processing at the control of provided captured radar data, presence of an object present exterior the equipped vehicle and within the field of sensing of the at least one forward-sensing radar sensor.

3. The method of claim 2, wherein the provided captured radar data is processed at the control to determine surfaces of the detected object.

4. The method of claim 3, wherein the control determines the oblique angle of the determined direction of travel of the other vehicle to based on determination, via processing at the control of the provided captured radar data, of a body side of the determined other vehicle.

5. The method of claim 3, further comprising determining a classification of the detected object based on motion factors.

6. The method of claim 5, wherein the classification is one selected from the group consisting of (i) stationary, (ii) vehicular and (iii) pedestrian.

7. The method of claim 6, wherein a set of the provided captured radar data that is analyzed and classified as stationary is aggregated into a high definition environmental map.

8. The method of claim 1, wherein the control determines the oblique angle of the determined direction of travel of the other vehicle based at least in part on the determined lane markers of the traffic lane that the equipped vehicle is traveling in on the road being traveled along by the equipped vehicle.

9. The method of claim 1, wherein the sensing system comprises two or more individual radar sensors, each having multiple transmitting antennas and multiple receiving antennas on a respective antenna array, and wherein the two or more individual radar sensors are spaced at a known separation and aligned at a known attitude, and wherein information is shared between the two or more individual radar sensors operating in stereo to determine high definition radar reflection responses for objects detected by the sensing system.

10. The method of claim 1, comprising utilizing, at the control, path information and at least one of (i) environment mapping and (ii) vehicle oblique angles to implement closed loop motion control to mitigate collision.

11. The method of claim 10, wherein the closed loop motion control includes control of at least one of steering of the equipped vehicle, braking of the equipped vehicle and acceleration of the equipped vehicle.

12. The method of claim 1, wherein the at least one forward-sensing radar sensor is disposed at a front portion of the equipped vehicle.

13. The method of claim 1, further comprising processing at the control provided captured radar data for at least one driving assist system function of the equipped vehicle selected from the group consisting of (i) an automated parking function of the equipped vehicle, (ii) a blind spot detection function of the equipped vehicle, (iii) a cross traffic alert function of the equipped vehicle, (iv) a lane change assist function of the equipped vehicle, (v) a lane merge assist function of the equipped vehicle, (vi) an automatic emergency braking function of the equipped vehicle, (vii) a pedestrian detection function of the equipped vehicle, (viii) a turn assist function of the equipped vehicle and (ix) an intersection collision mitigation function of the equipped vehicle.

14. The method of claim 1, further comprising (i) disposing at least one rearward sensing radar sensor at a rear portion of the equipped vehicle and sensing rearward of the equipped vehicle, and (ii) determining, via the control, and responsive to processing at the control of radar data captured by the rearward sensing radar sensor and provided to the control, edges of a trailer being towed by the equipped vehicle, and (iii) determining, based on the determined edges of the trailer, a trailer angle of the trailer relative to the equipped vehicle.

15. The method of claim 14, comprising determining, via the control, (i) a frequency of trailer sway of the trailer relative to the equipped vehicle and/or (ii) an amplitude of trailer sway of the trailer relative to the equipped vehicle.

16. The method of claim 15, comprising dampening the trailer sway responsive to a determined trailer sway frequency and/or a determined trailer sway amplitude.

17. A method for anticipating a lane change by another vehicle ahead of a vehicle equipped with a sensing system, the method comprising:

disposing at least one forward-sensing radar sensor at a vehicle equipped with the sensing system, the at least one forward-sensing radar sensor having a field of sensing exterior and at least forward of the equipped vehicle, wherein the at least one forward-sensing radar sensor comprises an antenna array having multiple transmitting antennas and multiple receiving antennas;

disposing a forward-viewing camera at the equipped vehicle and having a field of view exterior and at least forward of the equipped vehicle;

providing a control at the equipped vehicle, the control comprising at least one processor;

transmitting, via the transmitting antennas, radar signals and receiving, via the receiving antennas, the radar signals reflected off objects, and capturing, via the at least one forward-sensing radar sensor, radar data based on the received radar signals;

providing the radar data captured by the at least one forward-sensing radar sensor to the control;

capturing image data via the forward-viewing camera;

providing the image data captured by the forward-viewing camera to the control;

determining, via the control, and responsive to processing at the control of provided captured image data, lane markers of a traffic lane that the equipped vehicle is traveling in on a road being traveled along by the equipped vehicle;

determining, via the control, and responsive to processing at the control of provided captured image data, presence of another vehicle in the field of view of the forward-viewing camera and in a traffic lane adjacent to the traffic lane that the equipped vehicle is traveling in;

determining, via the control, and responsive to processing at the control of the provided captured radar data, (i) a direction of travel of the determined other vehicle and (ii) an oblique angle of the determined direction of travel of the other vehicle relative to the traffic lane that the equipped vehicle is traveling in;

determining, via the control, whether the determined oblique angle is indicative of a cut-in intent of the determined other vehicle to move into the traffic lane that the equipped vehicle is traveling in;

determining, via the control, and responsive to determination that the determined oblique angle of the determined direction of travel of the other vehicle is indicative of the cut-in intent of the determined other vehicle, range to the determined other vehicle;

responsive to determination that the determined oblique angle of the determined direction of travel of the other vehicle is indicative of the cut-in intent of the determined other vehicle, and based on the determined range to the determined other vehicle, (i) anticipating the cut-in of the determined other vehicle ahead of the equipped vehicle into the traffic lane that the equipped vehicle is traveling in and (ii) applying a braking system of the equipped vehicle to mitigate collision with the determined other vehicle; and processing at the control provided captured radar data for at least one driving assist system function of the equipped vehicle selected from the group consisting of (i) an automated parking function of the equipped vehicle, (ii) a blind spot detection function of the equipped vehicle, (iii) a cross traffic alert function of the equipped vehicle, (iv) a lane change assist function of the equipped vehicle, (v) a lane merge assist function of the equipped vehicle, (vi) an automatic emergency braking function of the equipped vehicle, (vii) a pedestrian detection function of the equipped vehicle, (viii) a turn assist function of the equipped vehicle and (ix) an intersection collision mitigation function of the equipped vehicle.

18. The method of claim 17, wherein the control determines the oblique angle of the determined direction of travel of the other vehicle based at least in part on the determined lane markers of the traffic lane that the equipped vehicle is traveling in on the road being traveled along by the equipped vehicle.

19. The method of claim 17, wherein the control determines the oblique angle of the determined direction of travel of the other vehicle based on determination, via processing at the control of the provided captured radar data, of a body side of the determined other vehicle.

20. The method of claim 17, wherein the sensing system comprises two or more individual radar sensors, each having multiple transmitting antennas and multiple receiving antennas on a respective antenna array, and wherein the two or more individual radar sensors are spaced at a known separation and aligned at a known attitude, and wherein information is shared between the two or more individual radar sensors operating in stereo to determine high definition radar reflection responses for objects detected by the sensing system.

21. A method for anticipating a lane change by another vehicle ahead of a vehicle equipped with a sensing system, the method comprising:
  disposing at least one forward-sensing radar sensor at a front portion of a vehicle equipped with the sensing system, the at least one forward-sensing radar sensor having a field of sensing exterior and at least forward of the equipped vehicle, wherein the at least one forward-sensing radar sensor comprises an antenna array having multiple transmitting antennas and multiple receiving antennas;
  disposing a forward-viewing camera at the equipped vehicle and having a field of view exterior and at least forward of the equipped vehicle;
  providing a control at the equipped vehicle, the control comprising at least one processor;
  transmitting, via the transmitting antennas, radar signals and receiving, via the receiving antennas, the radar signals reflected off objects, and capturing, via the at least one forward-sensing radar sensor, radar data based on the received radar signals;
  providing the radar data captured by the at least one forward-sensing radar sensor to the control;
  capturing image data via the forward-viewing camera;
  providing the image data captured by the forward-viewing camera to the control;
  determining, via the control, and responsive to processing at the control of provided captured image data, lane markers of a traffic lane that the equipped vehicle is traveling in on a road being traveled along by the equipped vehicle;
  determining, via the control, and responsive to processing at the control of provided captured image data, presence of another vehicle in the field of view of the forward-viewing camera and in a traffic lane adjacent to the traffic lane that the equipped vehicle is traveling in;
  determining, via the control, and responsive to processing at the control of the provided captured radar data, (i) a direction of travel of the determined other vehicle and (ii) an oblique angle of the determined direction of travel of the other vehicle relative to the traffic lane that the equipped vehicle is traveling in;
  determining, via the control, whether the determined oblique angle is indicative of a cut-in intent of the determined other vehicle to move into the traffic lane that the equipped vehicle is traveling in;
  determining, via the control, and responsive to determination that the determined oblique angle of the determined direction of travel of the other vehicle is indicative of the cut-in intent of the determined other vehicle, range to the determined other vehicle;
  responsive to determination that the determined oblique angle of the determined direction of travel of the other vehicle is indicative of the cut-in intent of the determined other vehicle, and based on the determined range to the determined other vehicle, (i) anticipating the cut-in of the determined other vehicle ahead of the equipped vehicle into the traffic lane that the equipped vehicle is traveling in and (ii) applying a braking system of the equipped vehicle to mitigate collision with the determined other vehicle; and
  wherein the sensing system is operable to provide at least one driving assist system function of the equipped vehicle selected from the group consisting of (i) an automated parking function of the equipped vehicle, (ii) a blind spot detection function of the equipped vehicle, (iii) a cross traffic alert function of the equipped vehicle, (iv) a lane change assist function of the equipped vehicle, (v) a lane merge assist function of the equipped vehicle, (vi) an automatic emergency braking function of the equipped vehicle, (vii) a pedestrian detection function of the equipped vehicle, (viii) a turn assist function of the equipped vehicle and (ix) an intersection collision mitigation function of the equipped vehicle.

22. The method of claim 21, wherein the control determines the oblique angle of the determined direction of travel of the other vehicle based at least in part on the determined lane markers of the traffic lane that the equipped vehicle is traveling in on the road being traveled along by the equipped vehicle.

23. The method of claim 21, wherein the sensing system comprises two or more individual radar sensors, each having multiple transmitting antennas and multiple receiving antennas on a respective antenna array, and wherein the two or more individual radar sensors are spaced at a known separation and aligned at a known attitude, and wherein information is shared between the two or more individual radar sensors operating in stereo to determine high definition radar reflection responses for objects detected by the sensing system.

* * * * *

UNITED STATES PATENT AND TRADEMARK OFFICE
CERTIFICATE OF CORRECTION

PATENT NO. : 11,597,378 B2  
APPLICATION NO. : 16/949813  
DATED : March 7, 2023  
INVENTOR(S) : Helmut Arnold Hardow Wodrich et al.

Page 1 of 1

It is certified that error appears in the above-identified patent and that said Letters Patent is hereby corrected as shown below:

In the Claims

<u>Column 8</u>  
Line 52, Claim 4, "vehicle to based on determination" should be --vehicle based on determination--

Signed and Sealed this  
Fourth Day of April, 2023

Katherine Kelly Vidal  
*Director of the United States Patent and Trademark Office*